April 25, 1961     W. W. MOE     2,981,005
BOLT GAUGE
Filed Feb. 11, 1958
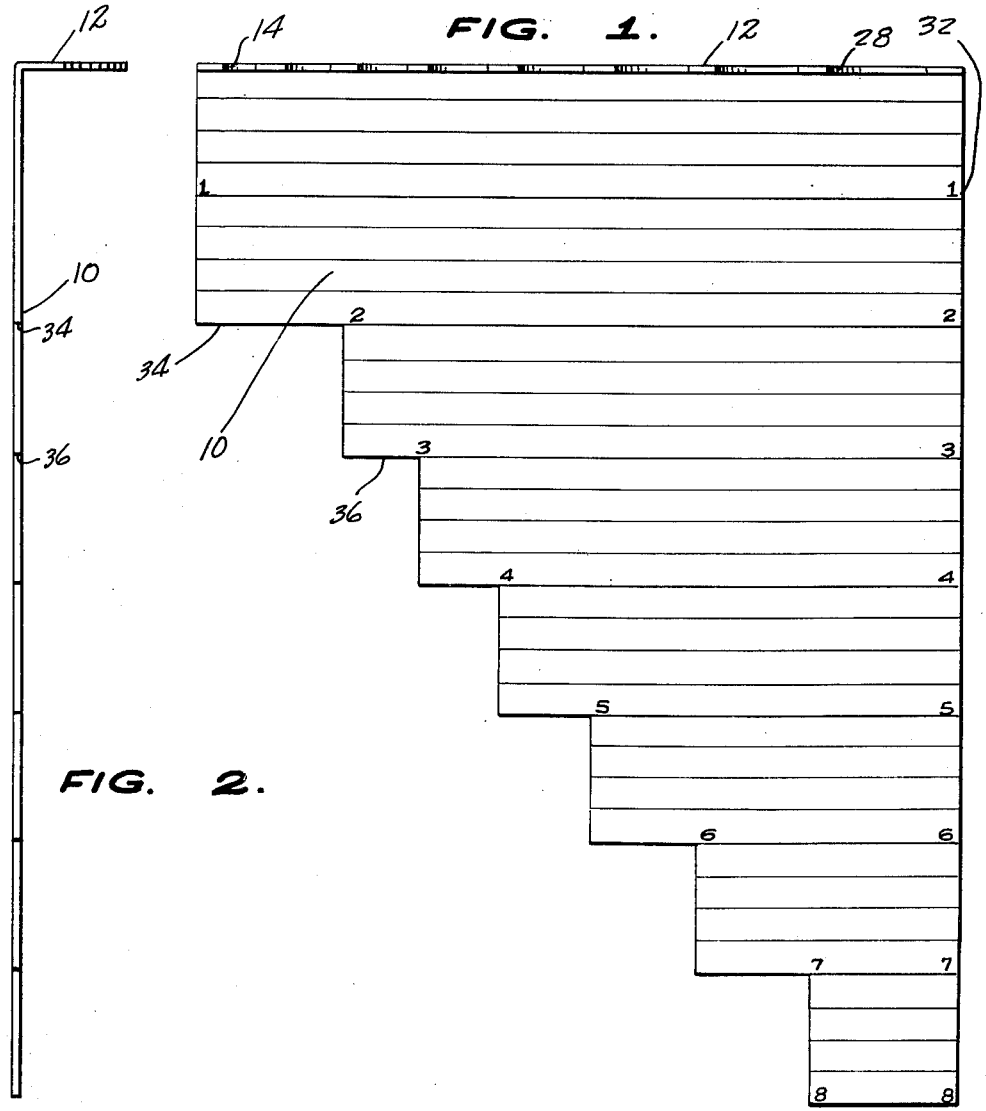
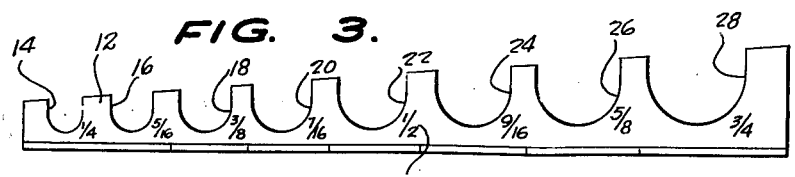
INVENTOR.
WALTER W. MOE,
BY
McMorrow, Berman + Davidson
ATTORNEYS.

United States Patent Office 2,981,005
Patented Apr. 25, 1961

2,981,005

BOLT GAUGE

Walter W. Moe, 718 N. 1st St., Montevideo, Minn.

Filed Feb. 11, 1958, Ser. No. 714,537

2 Claims. (Cl. 33—178)

The present invention relates to a gauge for bolts.

An object of the present invention is to provide a gauge for bolts which lends itself to ready measuring of bolt diameters and lengths.

Another object of the present invention is to provide a gauge for bolts which is simple in structure, one sturdy in construction, and one economical to manufacture.

These and other objects and advantages of the present invention will be fully apparent from the following description when taken in conjunction with the annexed drawing, in which:

Figure 1 is a plan view of the bolt gauge according to the present invention;

Figure 2 is a side elevational view; and

Figure 3 is an end elevational view.

Referring in greater detail to the drawing in which like numerals indicate like parts throughout the several views, the bolt gauge of the present invention comprises a rigid sheet 10 adapted to rest upon a flat supporting surface such as a table, work bench or the like. An upstanding plate 12 extends along the entire length of one end of the sheet 10 and is formed with a plurality of spaced recesses extending inwardly from the upper end and terminating at points spaced from the lower end of such plate 12.

The recesses are shown in Figure 3 and designated by the numerals 14, 16, 18, 20, 22, 24, 26, and 28, such recesses being all of a different size and each of a size conformable to a predetermined diameter of a bolt shank, the latter not being shown as not being a part of the present invention.

The plate 12 bears diameter indicia adjacent each of the recesses corresponding to the size of such recess, as at 30 in Figure 3 with respect to the recess 22.

The sheet 10 has a length measuring scale on its upper face and extending along one of the side edges from the plate 12 to the other end of the sheet 10 as at 32 in Figure 1 with respect to the numeral "1" which represents one inch of length of a bolt shank when supported in the adjacent recess.

The scale has intermediate lines representing quarter-inch increments of length extending from the plate 12 to the opposite end of the sheet 10.

The opposite side edge of the sheet 10 is uniformly stepped and graduated with the risers of the steps indicating length increments as at 34 in Figure 1. The first step on the left-hand side of the sheet 10 has its riser at the two-inch mark with the following risers of one-inch increments in lengths as at 36, with respect to the three-inch bolt shank length measurement.

While only a preferred embodiment of the present invention has been shown and described, other embodiments are contemplated and numerous changes and modifications may be made therein without departing from the spirit of the invention as set forth in the appended claims.

What is claimed is:

1. A bolt gauge comprising a rigid sheet adapted to rest upon a flat supporting surface, an upstanding plate extending along the entire length of one end of said sheet, said plate having a plurality of recesses extending inwardly from the upper end and terminating at points spaced from the lower end thereof, each of said recesses being of a size corresponding to a predetermined diameter of a bolt shank, all of said recesses being of different sizes, said sheet having a length measuring scale on the upper face and extending along one of the side edges from said plate to the other end of said sheet, said plate adjacent each of said recesses having a diameter indicium corresponding to the size thereof.

2. A bolt gauge comprising a rigid sheet adapted to rest upon a flat supporting surface, an upstanding plate extending along the entire length of one end of said sheet, said plate having a plurality of recesses extending inwardly from the upper end and terminating at points spaced from the lower end thereof, each of said recesses being of a size corresponding to a predetermined diameter of a bolt shank, all of said recesses being of different sizes, said sheet having a length measuring scale on the upper face and extending along one of the side edges from said plate to the other end of said sheet, said plate adjacent each of said recesses having a diameter indicium corresponding to the size thereof, the other of the side edges of said sheet being uniformly stepped and graduated, the risers of the steps indicating length increments.

References Cited in the file of this patent

UNITED STATES PATENTS

| | | |
|---|---|---|
| 387,966 | Beckwith | Aug. 14, 1888 |
| 697,701 | Ayer | Apr. 15, 1902 |
| 1,860,174 | Cronk | May 24, 1932 |
| 2,728,145 | Holladay | Dec. 27, 1955 |